United States Patent [19]

Gerber

[11] Patent Number: 5,486,389
[45] Date of Patent: Jan. 23, 1996

[54] ROLL OF TAPE WITH DOUBLY ADHESIVELY FACED PADS

[75] Inventor: Heinz J. Gerber, West Hartford, Conn.

[73] Assignee: Gerber Garment Technology, Inc., Tolland, Conn.

[21] Appl. No.: 325,544

[22] Filed: Oct. 18, 1994

Related U.S. Application Data

[63] Continuation of Ser. No. 109,147, Aug. 19, 1993, abandoned, which is a continuation of Ser. No. 681,861, Apr. 5, 1991, abandoned.

[51] Int. Cl.⁶ .............................. B65D 65/28; G09F 3/00
[52] U.S. Cl. .............................. 428/40; 428/42; 428/352; 428/354; 428/906; 206/411
[58] Field of Search .............................. 428/40, 42, 352, 428/354, 906; 206/411

[56] References Cited

U.S. PATENT DOCUMENTS

| | | |
|---|---|---|
| Re. 32,490 | 9/1987 | Jenkins . |
| 2,191,704 | 2/1940 | Bennett . |
| 2,805,183 | 9/1957 | Higgins . |
| 2,914,167 | 12/1959 | Holtz . |
| 3,383,121 | 6/1965 | Singer . |
| 3,537,578 | 11/1970 | Figlluzzi . |
| 3,741,786 | 5/1971 | Torrey . |
| 3,825,463 | 7/1974 | Amann . |
| 3,852,140 | 12/1974 | Jenkins . |
| 3,958,051 | 5/1976 | Smith . |
| 3,962,833 | 6/1976 | Johnson .............................. 428/40 X |
| 4,061,808 | 12/1977 | Sato . |
| 4,081,309 | 3/1978 | Jenkins . |
| 4,113,906 | 9/1978 | Brandwein . |
| 4,188,250 | 2/1980 | Grass . |
| 4,274,902 | 6/1981 | Jenkins . |
| 4,307,526 | 12/1981 | Wippern . |
| 4,346,189 | 8/1982 | Laurent .............................. 428/355 X |
| 4,390,577 | 6/1983 | Brister et al. . |
| 4,393,107 | 7/1983 | Jenkins . |
| 4,479,838 | 10/1984 | Dunsirn et al. .......................... 428/352 |
| 4,521,267 | 6/1985 | Jacobson . |
| 4,528,055 | 7/1985 | Hattemer .............................. 428/42 X |
| 4,577,426 | 3/1986 | Jenkins . |
| 4,642,256 | 2/1987 | Sato . |
| 4,770,914 | 9/1988 | Torgerson et al. .................. 428/354 X |
| 4,839,206 | 6/1989 | Waldenberger ...................... 428/354 X |
| 4,867,821 | 9/1989 | Morgan . |
| 4,950,518 | 8/1990 | Walliser .............................. 428/354 X |
| 5,006,184 | 4/1991 | Manusch et al. ........................ 156/577 |
| 5,096,777 | 3/1992 | Schacht et al. .......................... 428/355 |
| 5,130,185 | 7/1992 | Ness .......................................... 428/40 |
| 5,183,696 | 2/1993 | Sanderson .............................. 428/352 |

FOREIGN PATENT DOCUMENTS

| | | |
|---|---|---|
| 293916 | 10/1971 | Austria . |
| 1194696 | 11/1959 | France . |
| 2116989 | 4/1972 | Germany . |
| 2824811 | 12/1978 | Germany . |
| 3326132 | 7/1983 | Germany . |
| 3326132 | 2/1984 | Germany .............................. 428/42 |
| 3833517 | 4/1990 | Germany . |
| 47-1437 | 1/1972 | Japan . |
| 51-49256 | 11/1976 | Japan . |
| 58-92247 | 6/1983 | Japan . |
| 63-0671 | 1/1988 | Japan . |
| 2-28473 | 1/1990 | Japan . |
| 605320 | 12/1977 | Switzerland . |
| WO8909129 | 10/1989 | WIPO . |

Primary Examiner—George F. Lesmes
Assistant Examiner—Blaine R. Copenheaver
Attorney, Agent, or Firm—McCormick, Paulding & Huber

[57] ABSTRACT

A tape provides a supply of doubly adhesively faced pads for individual application to a receiving surface. The tape comprises a generally elongate flexible base layer of material having one side with a first release surface, and a plurality of pads of material carried on the first release surface of the base layer arranged in succession along the length of the base layer. Each of the pads has first and second tacky faces facing in opposite directions and has the first of its tacky faces releasably adhered to the first release surface of the base layer. The base layer of material has a second side facing oppositely to the first side and has a second release surface, so that the base layer may be rolled up to bring the second release surface thereof into engagement with the second tacky faces of the pads.

8 Claims, 4 Drawing Sheets

5,486,389

ROLL OF TAPE WITH DOUBLY ADHESIVELY FACED PADS

This is a continuation of application Ser. No. 08/109,147 filed on Aug. 19, 1993 which was a FWC application Ser. No. 07/681,861 filed on Apr. 5, 1991, now abandoned.

BACKGROUND OF THE INVENTION

The present invention resides in a double-sided adhesive and deals more particularly with an improvement in double-sided adhesive tape wherein the adhesive material is comprised of a multiplicity of pads which are readily transferrable onto a substrate or receiving surface without need of tearing the tape to effect its separation from the receiving surface.

Double-sided adhesive tape is widely used in a variety of applications, such as in mounting, laminating, or simply joining two confronting surfaces with one another. In such applications, these tapes often are comprised of two oppositely facing tacky surfaces separated from one another by the thickness of the material which constitutes it. Today, due to improvements in the adhesive technology, this thickness can be made extremely thin, for example on the order of one or two mils, without sacrificing significant adhesive capabilities. However, despite such thinness, these adhesive tapes are nevertheless relatively strong in tension. Hitherto, this tensile strength created problems when it came to detaching the applied portion of the continuous adhesive from that which had not. For example, it had been the practice to apply a continuous length of double-sided adhesive to a substrate surface using an applicator and to cause the tape remaining in the applicator to be separated from that which was applied to the surface by pulling the applicator away from this surface thus severing the adhesive along a line of tear. The force required to effect such separation often caused the substrate material, such as paper, to crumple, deform or possibly even rip. Furthermore, the line of tear along which the adhesive was separated was jagged and nonuniform. The jagged adhesive edges which remained on the substrate were undesirable in many applications since they did not define a clean adhesive break.

Accordingly it is an object of the present invention to provide a tape carrying double-sided adhesive material which is capable of being readily transferred to a substrate surface in quantities thereby avoiding the need to pull the tape apart in order to detach the applied adhesive from that which remains in supply.

It is a further object of the present invention to provide an adhesive material of the aforementioned type wherein the adhesive material is applied onto a substrate surface without resulting in a jagged edge being formed at its separation point.

It is still a further object of the present invention to provide a delivery system for readily applying quantities of adhesive material to a substrate surface without tearing a continuous length of adhesive.

It is a further object of the present invention to provide a method and a related apparatus for conditioning a continuous length of double-sided adhesive material such that the length of material is cut transversely of its length to define a multiplicity of adhesive pads which can be separated from one another such that only a selective number of such pads may be applied to a substrate surface for a given application.

It is yet a further object of the present invention to provide a base layer which carries quantities of adhesive material in roll form within an applicator capable of advancing the quantities of adhesive consecutively into engagement with a surface by moving the applicator and the surface relative to one another such that when such motion is stopped the adhesive quantity immediately in contact with the substrate surface is readily released from the base layer which carries it.

SUMMARY OF THE INVENTION

A tape provides a supply of doubly adhesively faced pads for individual application to a receiving surface. The tape comprises a generally elongate flexible base layer of material having one side with a first release surface, and a plurality of pads of material carried on the first release surface of the base layer arranged in succession along the length of the base layer. Each of the pads has first and second tacky faces facing in opposite directions and has the first of its tacky faces releasably adhered to the first release surface of the base layer. The base layer of material has a second side facing oppositely to the first side and has a second release surface, so that the base layer may be rolled up to bring the second release surface thereof into engagement with the second tacky faces of the pads, the adherence between the second release surface and the second faces of the pads being less than the adherence between the first release surface and the first faces of the pads so that as the base layer is unrolled the pads release from the second release surface and remain adhered to the first release surface.

The invention further resides in a method wherein a continuous length of double-sided adhesive bonded to an underlying base layer is conditioned by causing a series of transversely extending cuts to be formed in the adhesive material so as to define the plurality of adhesive pads carried by the base layer. In the process of forming these pads, a barrier layer is simultaneously created along the side edges thereof thus preventing the pads from adhering to one another after being formed.

Other objects and advantages of the present invention will become apparent from the following disclosure and appended claims.

DETAILED DESCRIPTION OF THE PREFERRED EMBODIMENTS

Figure 1:
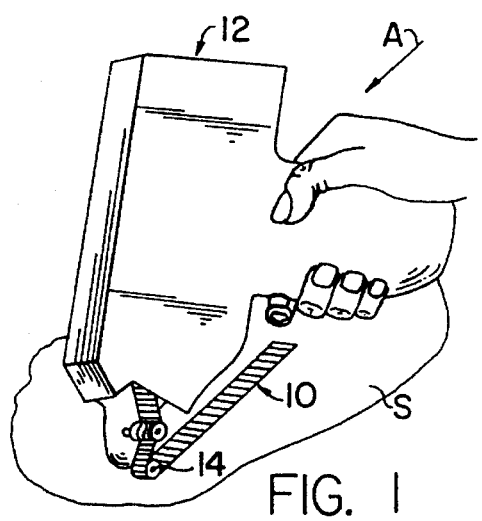
FIG. 1 is a perspective view of the adhesive material which embodies the present invention being applied onto a substrate surface.

In FIG. 1, an adhesive embodying the invention is illustrated at 10 and is shown in the process of being applied to a receiving or substrate surface S by an applicator 12. The applicator 12 may be any one of a number of commercially available applicators adapted for applying adhesive tape to a surface, such as a SCOTCH Brand Model 752 ATG available from the 3M Company. The applicator 12 which is shown in the exemplary embodiment of FIG. 1 includes a handle which is capable of being easily gripped by a user and a contact roller 14 disposed outwardly thereof for precisely applying the adhesive 10 in a given orientation on the substrate S. Although shown in FIG. 1 as being applied by manual manipulation of the applicator 12, the adhesive 10 may in other applications be delivered to the surface S in a variety of different ways, including a mechanically actuated system.

Figure 2:
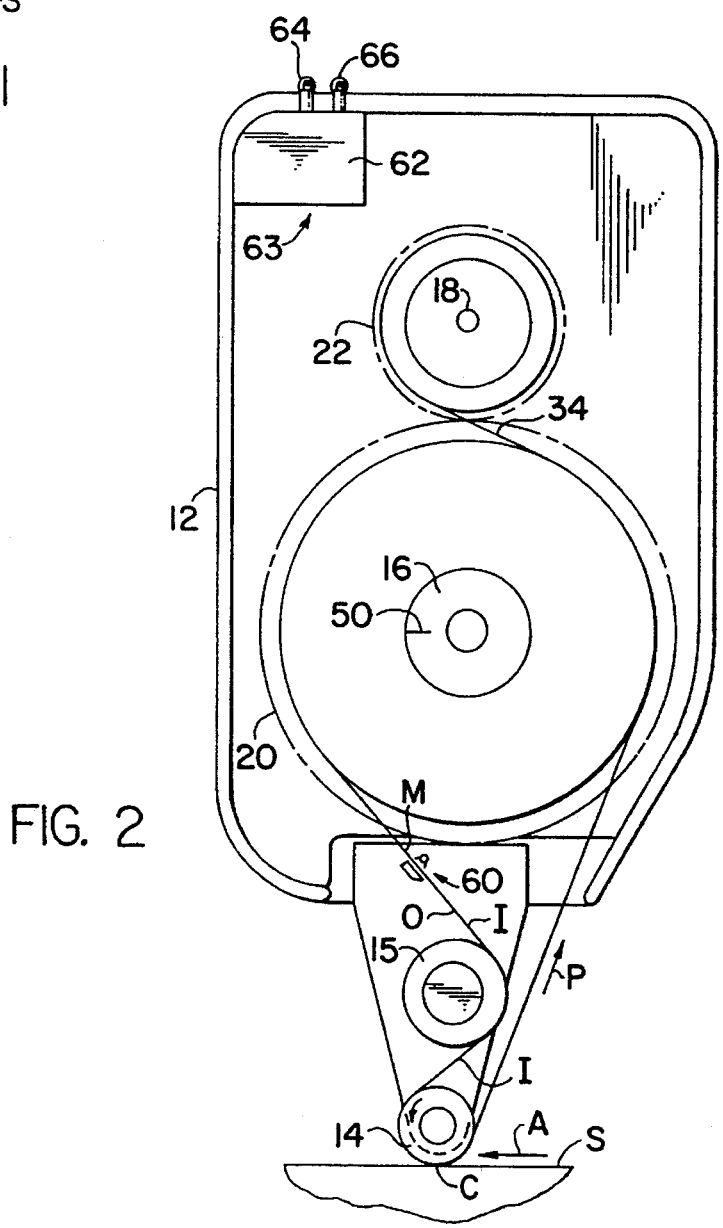
FIG. 2 is a sectional view taken through an applicator for dispensing the adhesive material onto a substrate surface.

As illustrated in FIG. 2, the applicator 12 includes a delivery means comprising a supply reel 16 and a take-up reel 18 mechanically coupled to one another through the intermediary of gears 20 and 22 associated respectively with each of the supply and the take-up reels. The supply reel 16 contains a supply of adhesive tape in roll form which is caused to travel tangentially away from the supply reel 16 disposing the adhesive material along side O of its path of travel P. The adhesive and its carrier engage on an idler roller 15 such that the adhesive part of the tape is directed outwardly when supported on the contact roller 14 and the take-up reel rolls the carrier on itself after its engagement with the contact roller 14. The idler roller 15 has a series of circumferentially disposed grooves formed radially inwardly of it thereby reducing its contact surface with the adhesive, consequently preventing the adhesive from being prematurely peeled away from the carrying media. As will hereinafter become apparent, the delivery means delivers the adhesive to the surface S by induced relative movement therebetween accomplished through the intermediary of the contact roller 14.

Figure 3:
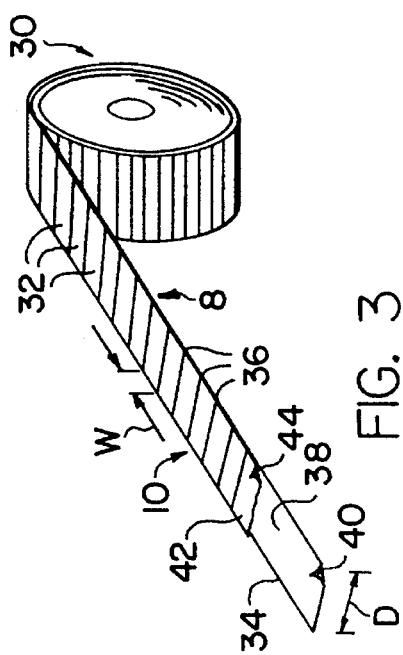
FIG. 3 is a perspective view of a roll of adhesive tape which embodies the invention shown in its partially unravelled condition.

In accordance with the invention, FIG. 3 shows the adhesive 10 of FIG. 1 in its undeployed condition in which it constitutes one layer of a tape indicated generally as 8. The tape 8 is further comprised of a base layer 34 which functions as the carrier for the adhesive moving it through the applicator in a manner heretofore discussed. A multiplicity of pads of material 32,32 comprise the adhesive 10 and are arranged in succession on one surface of the base layer 34. Each of the pads 32,32 has two side edges 36,36 in substantially abutting relationship to the adjacent side edges of its two neighboring pads. As will hereinafter become apparent with reference to the method of making the tape 8 and as shown more particularly in FIG. 4, the side edges 36,36 of each pad 32,32 include a barrier layer 33,33 which tends to prevent the neighboring side edges from adhering to one another.

The base layer 34 is a generally elongate thin flexible length of material which includes a first release surface 38 disposed on the one side facing the pads 32,32 and includes a second release surface 40 disposed on the other oppositely facing side. Each pad includes a first tacky face 44 facing towards and releasable bonded with the first release surface 38 of the base layer 34 and a second tacky face 42 facing outwardly and away from the base layer 34. As illustrated, the second release surface 40 allows the base layer 34 to be rolled up to bring the second release surface thereof into engagement with the second tacky faces 42,42 of the pads so that the tape 8 may be releasably held in roll form by the exposed tacky faces 42,42 of the pads 32,32 to create the supply roll 30 which is eventually contained in the receptacle portion of the applicator 12. It is herein noted that the adherence between the second release surface 40 and the second tacky faces 42,42 of the pads 32,32 is less than the adherence between the first release surface 38 and the first tacky faces 44,44 of the pads so that as the base layer 34 is unrolled, the pads release from the second release surface 40 and remain adhered to the first release surface.

In the illustrated example of FIG. 2, motion is imparted to the tape when the roller 14 is moved into engagement with the surface S and rotated as a result of the applicator being moved in the indicated direction A. To effect this, the contact roller 14 is formed from a frictional material, such as rubber, and the base layer 34 is sized relative to it along its dimension indicated as a D extending transversely of its length such that this dimension is somewhat less than the length of the contact roller 14 thus allowing a portion of the frictional surface of this roller to be exposed to the surface S for driving engagement with it.

The surface S has a texture which more aggressively adheres to the second tacky face 42,42 of each pad 32,32 than does its associated first tacky adhesive face 44,44 adhere to the first release surface 38. Consequently, this causes each pad which is advanced into contact with the surface S to be readily peeled away from the release surface 38 with continued rotation of the contact roller 14. Delivery of the pads in this manner is further prompted by their being formed with a width W so sized that for a given rotation of the contact roller 14, a side edge 36,36 is disposed at or generally proximate to the contact point C between the roller 14 and the substrate surface S. This allows the pad instantly being applied to be separated from those which remain on the base layer along its trailing edge 36. Thus, the problems hitherto associated with reference to separating a continuous adhesive tape by pulling it apart are overcome by the present invention.

Table A-1 below lists for purposes of illustration, characteristics of the tape 8.

TABLE A-1

| THICKNESS | ADHESIVE TYPE | ADHESIVE MATERIAL | ADHERENT STRIP WIDTH (W) | BASE LAYER WIDTH (D) |
| --- | --- | --- | --- | --- |
| 0.002"–0.005" | PRESSURE | ACRYLIC | 0.25" (approx.) | 0.5"–0.75" |

TABLE A-1-continued

| THICKNESS | ADHESIVE TYPE | ADHESIVE MATERIAL | ADHERENT STRIP WIDTH (W) | BASE LAYER WIDTH (D) |
|---|---|---|---|---|
| | SENSITIVE | (throughout) | | |

Figure 5:
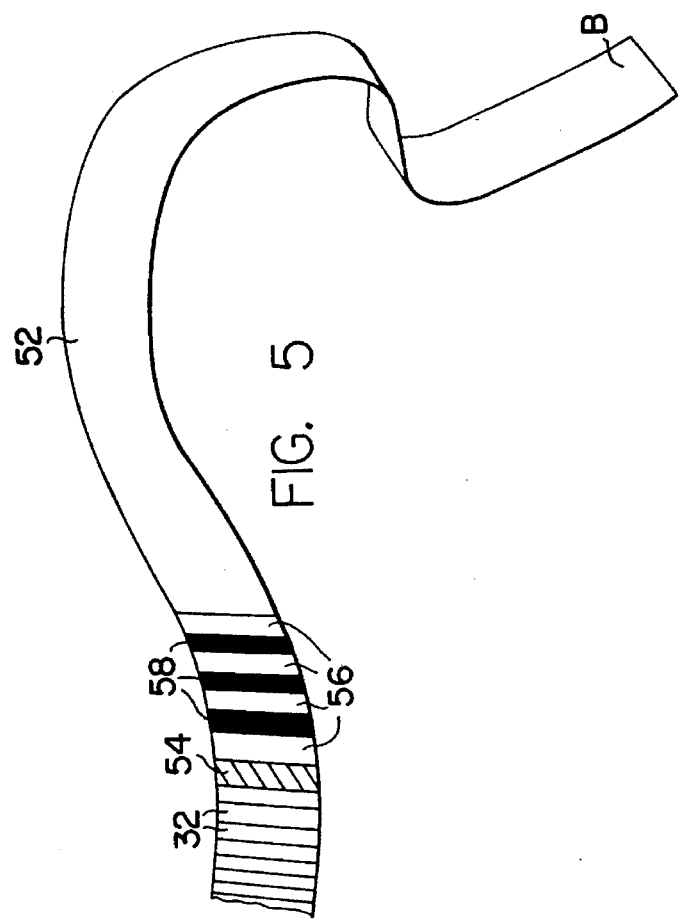
FIG. 5 shows a trailer piece having indicia means attached to the trailing end of the tape shown in FIG. 4.

In FIG. 5, a trailer piece shown generally as 52 is provided such that it is connected to the trailing end of the tape 8. The trailer piece 52 is connected to the tape 8 at attachment point 54 by a suitable means, such as adhesive, and has another opposite free end B suitably sized to be received within a slot 50 formed in the supply reel 16. Located along the trailer piece 52 proximate the attachment point 54 are indicia means comprised of at least one transparent and one opaque stripe indicated respectively as 56 and 58. These alternating stripes 56 and 58 provide a means by which the end of the tape 8 can be detected. For this purpose, as illustrated in FIG. 2, the invention provides a sensing means 60 within the applicator which cooperates with the indicia means to detect it and ultimately to signal to a user that the supply of adhesive is about to run out. While the sensing means 60 may be any one of a number of different types of sensors capable of detecting indicia, in the preferred embodiment, the means 60 includes a light emitting diode and associated sensor located on opposite sides of the path P followed by the tape 8.

The sensing means 60 is located remotely of the contact point C at the indicated position M distanced along path P from this point by approximately 2" such that when the means 60 first detects the indicia at the location M, there still remains a sufficient number of pads on the base layer 34 between this point and the contact point C to allow the user to finish the present job while nevertheless being aware that the adhesive supply is about to run out. An indicating means 63 may also be provided to notify a user of the status of the adhesive supply. The indicating means 63 includes a conventional circuit 62 which is connected to the sensing means 60 and cooperates with it to controllably activate an indicator when particular indicia stripes are recognized. For example, when the first alternating stripes are detected, a first indicator light 64 may be energized representing the condition where the last two or so inches of tape is left and when the last alternating stripes are detected, a second indicator light 66 may be energized representing the condition where the supply of adhesive is totally depleted.

Figure 6:
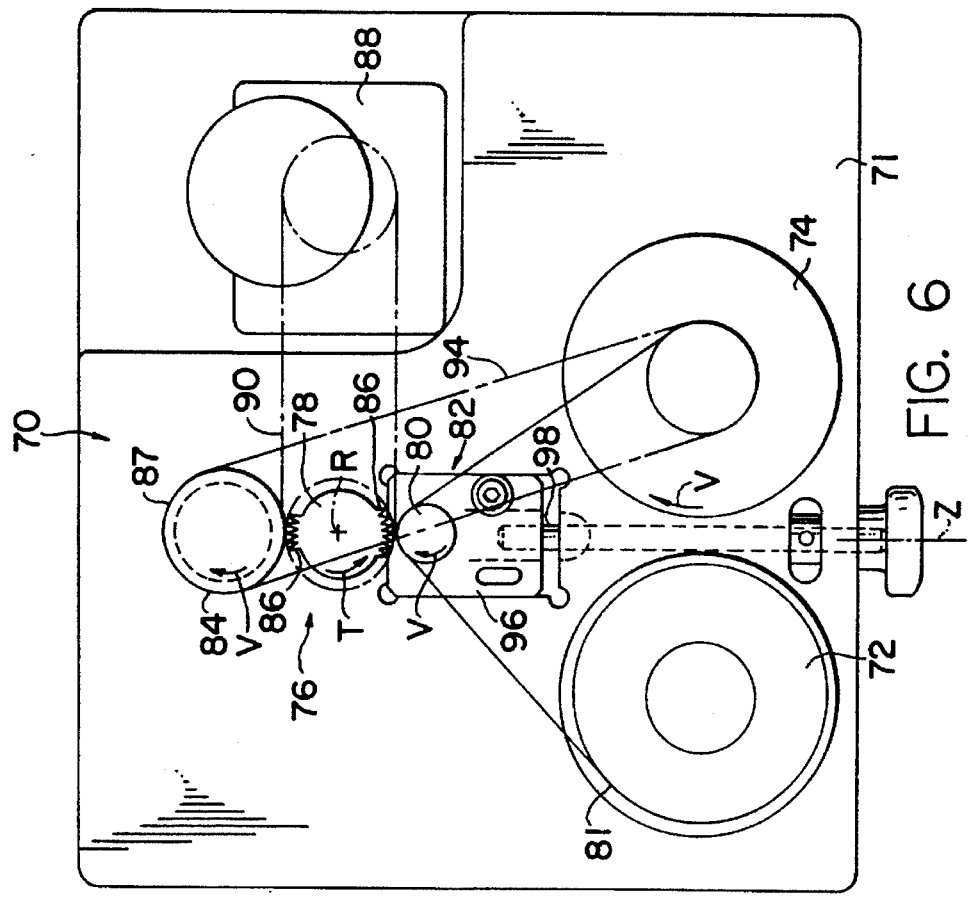
FIG. 6 is a top plan view illustrating of an apparatus for preconditioning double-sided tape in accordance with one aspect of the invention.
Figure 7:
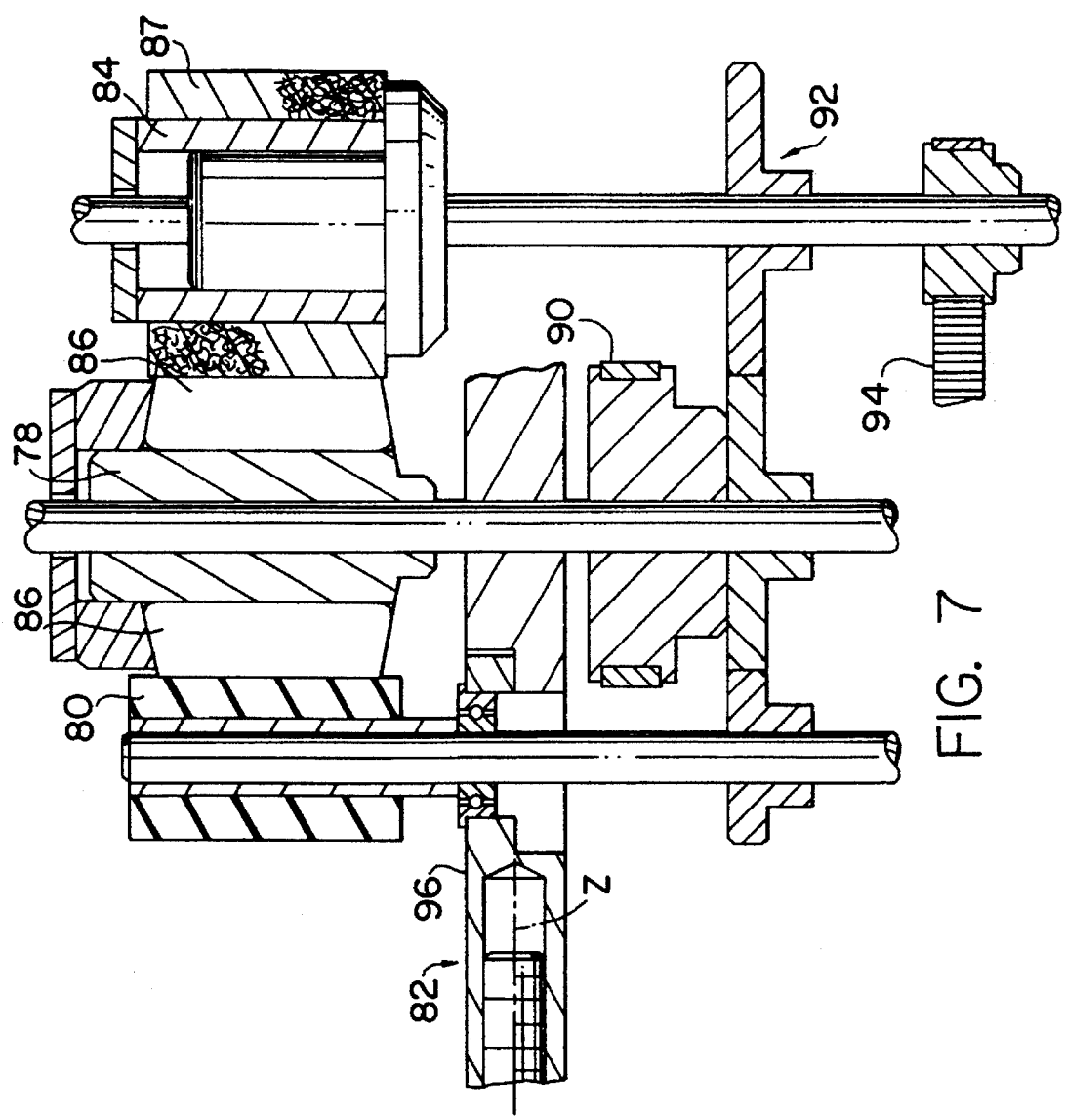
FIG. 7 is a partially fragmented side elevation view of the apparatus shown in FIG. 6.

In FIGS. 6 and 7, a method and related apparatus 70 for creating the multiplicity of pads 32,32 is shown. This method includes providing a supply 81 of commercially available double-sided adhesive tape having a carrier backing thereon and subsequently conditioning it whereby the end result of this process is the formation of the multiplicity of readily transferrable pads releasably held on the carrier. While a variety of commercially available tapes may be employed for this purpose, an example of a suitable tape is one made by 3M Corporation and marketed under the tradename SCOTCH ATG.

The apparatus 70 includes a base 71 which rotatably supports a supply reel 72, a take-up reel 74 and a perforation means 76 interposed therebetween. The perforation means 76 includes a cutting wheel 78 rotatable about its center R and an adjacently disposed rotating anvil 80 which is adjustably located relative to the cutting wheel 78 by an adjustment means 82 cooperatively mounted to the base 71. The cutting wheel 78 further includes a plurality of dovetail slots disposed circumferentially about it receiving the correspondingly shaped and sized base portions of a plurality of blades 86,86 which extend radially outwardly therefrom about the center R. The apparatus 70 further includes a lubricating roller 84 drivingly rotatably connected to the cutting wheel 78. The lubricating roller 84 is disposed on the base 71 adjacent the cutting wheel 78 so as to yieldably engage with the end regions of the blades 86,86. For this purpose, the lubricating roller 84 includes an outwardly disposed absorbant sleeve 87 which maintains a reservoir of liquid lubricant therein applied to end regions of the blades 86,86 through rotational engagement therewith. In the preferred embodiment of the invention, the lubricant supplied to the sleeve 87 is silicone and acts to both keep the blades 86,86 from sticking to the adhesive layer as they cut it while also being the material responsible for creating the boundary layers 33,33 on the side edges of each pad.

A drive motor 88 is mounted to the base 71 and is drivingly coupled by a belt 90 to the cutting wheel 78 to rotate it, the lubricating roller 84 and the take-up reel 74 together with one another. The rotating anvil 80, the lubricating roller 84 and the cutting wheel 78 are each drivingly connected with one another through the intermediary of gearing 92 such that the cutting wheel 78 is rotated in the rotational direction indicated as T, while the roller 84 and the anvil 80 are caused to be rotated oppositely in the indicated V direction. The take-up reel 74 is likewise driven in rotation with the lubricating roller 84 in the V rotational direction by a second belt 94 which rotatably couples it and the lubricating roller 84 to one another.

The cutting wheel 78 is adapted to cut through the adhesive layer while only slightly scoring the base layer which carries it. For this purpose the adjustment means 82 includes a slide 96 which carries the cutting wheel 78 and is mounted to the base 71 for movement along the axis indicated as Z in response to being urged in this manner by an elongate threaded actuator 98 disposed between the slide and the base 71.

Figure 8:
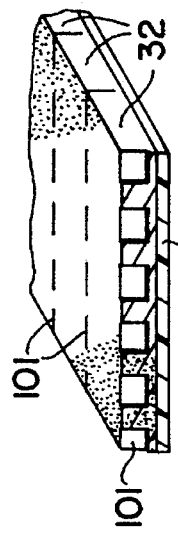
FIG. 8 shows an alternate embodiment of the pad shown in FIG. 4 wherein the pad is defined by a transverse perforation.

In use, the unconditioned tape 81 is drawn from the supply reel 72 into the bite between the rotating anvil 80 and the blades 86,86 with the adhesive surface thereof facing the cutting wheel 78 such that worked on tape is subsequently collected on the take-up reel 74 so as to form a roll similar to that shown in FIG. 3. In advancing the supply tape 81 past the cutting wheel 78, the adhesive layer is transversely cut thus forming the consecutively ordered multiplicity of pads 32,32. In so doing, each blade 86,86 through its engagement with the lubricating roller 78, carries away lubricant on the end surfaces thereof and through its cutting action, the lubricant is caused to be introduced along the side edges of each pad thereby resulting in the simultaneous formation of the barrier layers 33,33. Because the lubricant penetrates and weakens the adhesive, it aids in weakening any uncut adhesive remaining between adjacent ones of the pads 32,32. While it is preferable to completely cut the adhesive layer, the cutting wheel 78 may only partially cut the adhesive to form weakened separation lines between adjacent pads. As shown in FIG. 8, the separation lines between adjacent ones of the pads 32,32 may take the form of a perforated line defined by a series of transversely extending slits 101,101 or alternatively may be formed by chemically weakening the adhesive along such lines of separation.

Figure 4:
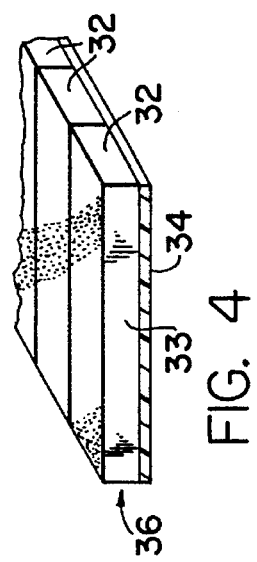
FIG. 4 is an enlarged partially fragmentary perspective view of the side edge of a pad showing the boundary layer disposed thereon.
Figure 9:
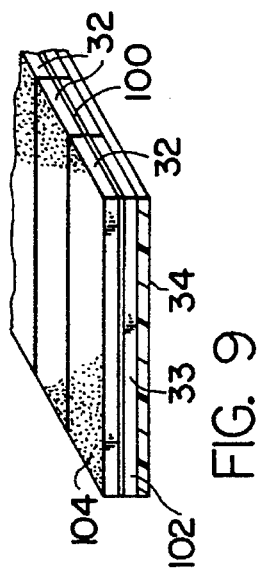
FIG. 9 is an alternate embodiment of the pad shown in FIG. 4 showing it in an enlarged partially fragmentary perspective view.

While in the preferred embodiment, the adhesive material from which the pads 32,32 are formed is shown in FIG. 4 as a homogeneous adhesive, it is nevertheless possible to alternatively employ a laminate as shown in FIG. 9 for this purpose. The laminate may be comprised of a thin two-sided sheet of carrier material 100 having a first layer of adhesive material 102 bonded to one side thereof and a second layer of adhesive 104 bonded to its other side. By way of example, the carrier material 100 may have a thickness of about three to four mils with the total thickness of the laminate equally about six to seven mils. Additionally, while the apparatus shown in FIGS. 6 and 7 utilizes a cutting wheel to create separable pads, it is nevertheless possible to employ a reciprocating blade cooperating with a tape advancing system driven by a step motor for the purpose of advancing the tape incrementally to the cutting station where a cut or perforation is made in the adhesive layer for each increment advanced.

Accordingly the invention has been described by way of illustration rather by way of limitation.

I claim:

1. A roll of tape providing a supply of doubly adhesively faced pads for individual application to a receiving surface, said roll of tape comprising:

a generally elongate flexible base layer of material wound into a roll and having one side with a first release surface;

at least one layer of adhesive releasably bonded to said first release surface of said base layer, said at least one layer of adhesive having a multiplicity of separation lines extending transversely of the length of said base layer and spaced from one another along the length of said base layer to define a plurality of pads of material carried on said first release surface with each pad having two side edges extending generally parallel to each other and arranged in abutting relationship to the adjacent side edges of its two neighboring pads such that said plurality of pads are arranged in succession along the length of said base layer, each of said pads being readily separable from an adjacent one of said pads along the intervening one of said separation lines;

each of said pads having first and second tacky faces facing in opposite directions and having said first of its tacky faces releasably adhered to said first release surface of said base layer; and barrier means associated with each side edge of each of said plurality of pads for keeping abutting ones of said side edges from adhering to one another, said barrier means being a layer of liquid lubricant material on each side edge of each of said plurality of pads which lubricant material penetrates and weakens said at least one layer of adhesive along said separation lines;

said base layer of material having a second side facing oppositely to said first side, said second side having a second release surface engaging said second tacky faces of said pads, the adherence between said second release surface and said second faces of said pads being less than the adherence between said first release surface and said first faces of said pads so that as said base layer is unrolled from said roll said pads release from said second release surface and remain adhered to said first release surface to expose said second tacky faces of the released pads for application onto a receiving surface such that the pads applied to the receiving surface are thereafter releasable from said first release surface and are cleanly separable along one of said separation lines from the pads not applied to the receiving surface.

2. A roll of tape as defined in claim 1 further characterized in that each of said pads is comprised of a homogeneous film of adhesive material having oppositely disposed surfaces respectively defining said first and second tacky faces.

3. A roll of tape as defined in claim 1 further characterized in that each of said pads is comprised of a thin two-sided sheet of carrier material having a first layer of adhesive material bonded to one side thereof and a second layer of adhesive material bonded to the other side thereof.

4. A roll of tape as defined in claim 1 further characterized in that said base layer has a first end and a second opposite end, said second end being located inwardly of said roll from said second end so that said second end of said base layer becomes unwound from said roll only after all the rest of said base layer has been unwound from said roll;

an elongate trailer piece having a first end attached to said base layer at said second end of said base layer and having a second end located inwardly of said roll from said first end of said trailer piece; and indicia means on said trailer piece for indicating, when exposed by the unwinding of tape from said roll, the state of all of said base layer having been unwound from said roll.

5. A roll of tape as defined in claim 4 further characterized in that said indicia means includes at least a first transparent stripe and at least a first opaque stripe each extending generally transversely to the length of said trailer piece.

6. A roll of tape as defined in claim 4 further characterized in that said first transparent stripe and said first opaque stripe are located near the connection between said trailer piece and said base layer; and said trailer piece further includes at least a second transparent stripe and at least a second opaque stripe located a substantial distance from said first transparent stripe and said first opaque stripe so as to indicate, when said second stripes become exposed, a still further advanced state of unwinding of tape from said roll.

7. A roll of tape as defined in claim 1 further characterized in that the adjacent ones of said pads are completely separated from one another along each of said separation lines.

8. A roll of tape as defined in claim 1 further characterized by each of said separation lines being defined by a line of perforations extending generally transversely to the length of said base layer.

* * * * *